(12) United States Patent
Puchwein et al.

(10) Patent No.: US 9,452,894 B2
(45) Date of Patent: Sep. 27, 2016

(54) STORAGE AND ORDER-PICKING SYSTEM FOR THE FULLY-AUTOMATED IDENTIFICATION AND PICKING OF ARTICLES

(71) Applicant: KNAPP AG, Hart Bei Graz (AT)

(72) Inventors: Peter Puchwein, Vasoldsberg (AT); Claus Blödorn, Graz (AT); Peter Stelzer, Gratkorn (AT); Franz Mathi, Gleisdorf (AT)

(73) Assignee: KNAPP AG, Hart Bei Graz (AT)

( * ) Notice: Subject to any disclaimer, the term of this patent is extended or adjusted under 35 U.S.C. 154(b) by 0 days.

(21) Appl. No.: 14/780,803

(22) PCT Filed: Feb. 10, 2014

(86) PCT No.: PCT/EP2014/052521
§ 371 (c)(1),
(2) Date: Sep. 28, 2015

(87) PCT Pub. No.: WO2014/166650
PCT Pub. Date: Oct. 16, 2014

(65) Prior Publication Data
US 2016/0075521 A1    Mar. 17, 2016

(30) Foreign Application Priority Data

Apr. 9, 2013   (AT) ............................... A 50239/2013

(51) Int. Cl.
*G06F 7/00*      (2006.01)
*G06F 19/00*    (2011.01)
(Continued)

(52) U.S. Cl.
CPC .............. *B65G 47/06* (2013.01); *B25J 9/0093* (2013.01); *B25J 9/1612* (2013.01); *B25J 9/1679* (2013.01);
(Continued)

(58) Field of Classification Search
None
See application file for complete search history.

(56) References Cited

U.S. PATENT DOCUMENTS

| 5,141,097 A | 8/1992 | Oiry et al. |
| 5,165,520 A | 11/1992 | Herve et al. |

(Continued)

FOREIGN PATENT DOCUMENTS

| DE | 298 06 960 U1 | 9/1998 |
| DE | 10 2009 042161 A1 | 4/2011 |

(Continued)

OTHER PUBLICATIONS

Kim et al., "Vision-Based Bin Picking System for Industrial Robotics Applications", 2012 9th International Conference on Ubiquitous Robots and Ambient Intelligence (URAI), Daejeon, Korea, Nov. 26-29, 2012, pp. 515-516.

(Continued)

*Primary Examiner* — Yolanda Cumbess
(74) *Attorney, Agent, or Firm* — Fitzpatrick, Cella, Harper & Scinto

(57) ABSTRACT

The invention relates to a storage and order-picking system (1) for the fully-automated picking of articles that are stored in storage loading aids (2) and are picked according to an order, which includes an article store, a first conveyor system that conveys storage loading aids leaving the article store to a picking station that is operated unmanned, a fully-automated robotic gripping unit on said picking station, which removes articles to be picked from said storage loading aids and deposits them in accordance with the order, the articles deposited according to an order, particularly in an order loading aid, subsequently being conveyed away by means of a second conveyor system, an image identification device for determining possible gripping points for the gripping unit in order to grip articles from the storage loading aids, wherein the image identification device comprises at least one and preferably at least two cameras in the region of the robotic gripping unit (9) and, if at least two cameras are provided, the capturing directions thereof are aligned into the storage loading aid located in the gripping region of the gripping unit, while being coordinated and in particular inclined toward each other.

13 Claims, 3 Drawing Sheets

(51) Int. Cl.
*B65G 47/06* (2006.01)
*B65G 1/137* (2006.01)
*B25J 9/00* (2006.01)
*B25J 9/16* (2006.01)
*B65G 43/08* (2006.01)

(52) U.S. Cl.
CPC ............ *B25J 9/1697* (2013.01); *B65G 1/1378* (2013.01); *B65G 43/08* (2013.01); *B65G 2203/041* (2013.01); *G05B 2219/39039* (2013.01); *G05B 2219/39102* (2013.01); *Y10S 901/31* (2013.01); *Y10S 901/47* (2013.01)

(56) References Cited

U.S. PATENT DOCUMENTS

| | | | |
|---|---|---|---|
| 5,374,830 | A | 12/1994 | Pryor |
| 6,854,588 | B1 | 2/2005 | Blattner et al. |
| 2010/0012464 | A1* | 1/2010 | Schiesser ............... B65G 43/08 198/460.1 |
| 2011/0170998 | A1* | 7/2011 | Winkler ............... B65G 1/1376 414/564 |
| 2013/0110280 | A1* | 5/2013 | Folk ....................... B65G 1/137 700/215 |

FOREIGN PATENT DOCUMENTS

| | | |
|---|---|---|
| DE | 10 2010 002 317 A1 | 8/2011 |
| DE | 10 2011 053 547 A1 | 3/2013 |
| EP | 2 315 714 A1 | 5/2011 |
| EP | 2 315 714 B1 | 10/2012 |
| FR | 2 666 315 A1 | 3/1992 |
| FR | 2 666 316 A1 | 3/1992 |
| WO | 97/42086 A1 | 11/1997 |
| WO | 2010/022832 A1 | 3/2010 |
| WO | 2012/163666 A1 | 12/2012 |

OTHER PUBLICATIONS

English translation, dated Oct. 15, 2015, of the International Preliminary Report on Patentability in International Application No. PCT/EP2014/052521.

* cited by examiner

STORAGE AND ORDER-PICKING SYSTEM FOR THE FULLY-AUTOMATED IDENTIFICATION AND PICKING OF ARTICLES

FIELD OF THE INVENTION

The invention relates to a storage and order-picking system for the fully-automated picking of articles that are stored in storage loading aids and are picked according to an order, comprising: an article store; a first conveyor system that conveys storage loading aids leaving the article store to a picking station that is operated unmanned; a fully-automated robotic gripping unit on said picking station, which removes articles to be picked from said storage loading aids and deposits them in accordance with the order, the articles deposited according to an order, particularly in an order loading aid, subsequently being conveyed away by means of a second conveyor system; an image identification device for determining possible gripping points for the gripping unit in order to grip articles from the storage loading aids.

BACKGROUND OF THE INVENTION

Document EP 2 315 714 B1 discloses such a storage and order-picking system from which articles to be picked are removed from the article store and are supplied to the robotic gripping unit formed by a delta robot via the first conveyor system. From the point of view of the article flow upstream on the first conveyor system, an image identification device allocated to the robotic gripping unit is provided which is directed at the storage loading aids conveyed with the first conveyor system. The known image identification device determines the location and position of the articles transported in the storage loading aids even if they are contained in the storage loading aid in random arrangement. Based on said location and position information on the individual articles, gripping points are determined by the image identification device for the gripping unit in order to grip one or several articles from the storage loading aids.

The known storage and order-picking system appears to have the disadvantage that the image identification device indeed determines, as the case may be, precise gripping points for the gripping unit, it may happen, however, that individual articles slip out of place during the transport of the storage loading aid from the image identification device to the robotic gripping unit. This occurs particularly if the articles in the storage loading aid lie piled up randomly and, thus, can slip out of place easily. In such a case, the gripping unit has incorrect gripping points and is not able to grip the article, for which reason an error situation occurs at the picking station. Said error situation can be corrected by the higher-ranking control device only with great difficulty, since the storage loading aid now has to be supplied once again to the picking station across the entire conveyor system. As a result, delays or errors in the order picking are possible.

Furthermore, the known storage and order-picking system appears to have the disadvantage that it is not possible to pick several articles from the same storage loading aid without again passing through the conveyor system and, thus, the upstream image identification device for each additional article to be picked, since the order pattern or, respectively, the position of each individual article may change after a gripping operation.

BRIEF SUMMARY OF THE INVENTION

The invention is based on the object of providing a storage and order-picking system wherein the previous disadvantages are avoided. According to the invention, said problem is solved in that the image identification device comprises at least one and preferably at least two cameras in the region of the gripping unit, and, if at least two cameras are provided, the capturing directions thereof are aligned into the storage loading aid located in the gripping region of the gripping unit, while being inclined toward each other.

As a result, the advantage is obtained that the image identification device determines possible gripping points for the selected article immediately before and even during the approach of the robotic gripping unit toward the article to be gripped. Since the image identification device is provided directly above the robotic gripping unit, a transport of the storage loading aid from the image identification device to the robotic gripping unit, during which the article(s) to be gripped might change their position or location, is not necessary. By arranging the cameras of the image identification device and by transferring the gripping points determined by the image identification device directly to the robotic gripping unit, the robotic gripping unit can also be readjusted still during the gripping operation and the article intended for picking can be gripped reliably.

A further advantage which has arisen is that several articles can be picked consecutively from a storage loading aid at the picking station, since a further image identification can be performed after each gripping operation. This is achieved by synchronizing the movement of the gripper of the gripping unit with the current image information of the image identification device.

However, it has proved to be particularly advantageous to determine the position of the at least two and advantageously four cameras of the image identification device depending on the storage loading aids used in the storage and order-picking system. Important in this regard is in particular the height and the width of the storage loading aids and whether compartment partitions divide the storage loading aids. As a result, it is ensured that all areas in the storage loading aids can be viewed properly by the image identification device for determining the location and position of the articles.

Furthermore, it has proved to be advantageous to illuminate the region of the image identification device with a pattern or grid. In this way, the accuracy of the determination of the position and location can be improved substantially. It is particularly advantageous to choose illuminants which illuminate in a frequency range not visible to humans and to choose cameras which are sensitive just in this frequency range.

The article gripped by the gripping unit can be held by the robotic gripping unit into the captured area of a camera of the image identification device for identifying the article by means of an identification (e.g., a barcode) attached to the article. Likewise, the gripped article can be held toward a label applicator which applies a label, or, respectively, a sticker to the article. As a result, the advantage is obtained that articles gripped by the gripping unit can be identified reliably and, optionally, marked in addition. Depending on which article has now been identified, the robotic gripping unit can deposit the gripped article in different order loading aids or at another place. As a result, the advantage is obtained that articles which are stored incorrectly in the storage loading aids and have also already been gripped with the gripping unit are still processed correctly.

Further advantageous embodiments of the storage and order-picking system according to the invention are illustrated in further detail below on the basis of the figures.

DETAILED DESCRIPTION OF THE INVENTION

Figure 1:
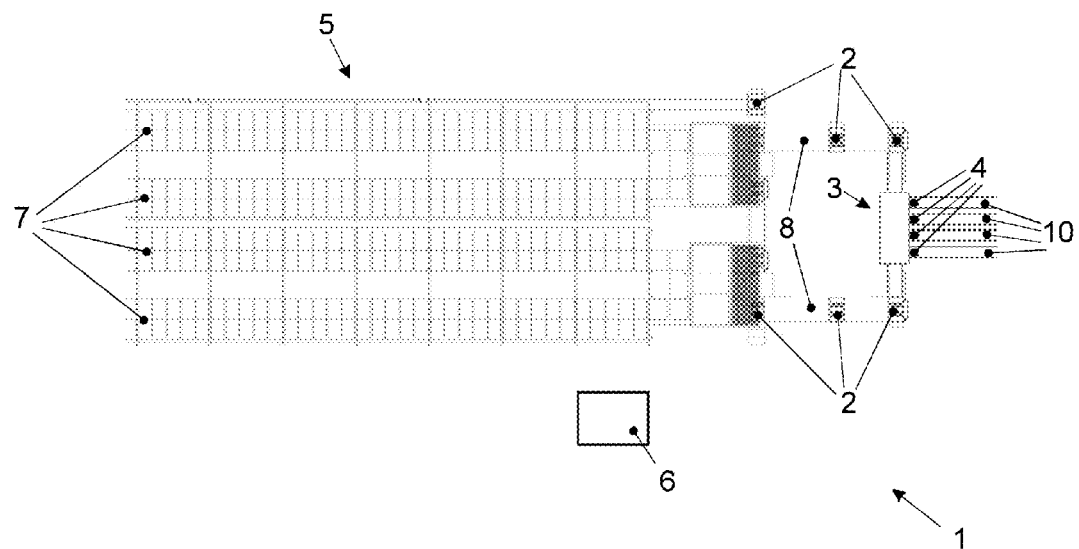
FIG. 1 schematically shows a detail of the layout of a storage and order-picking system comprising a picking station that is operated unmanned.

FIG. 1 schematically shows a detail of the layout of a storage and order-picking system 1 for the fully-automated picking of articles that are stored in storage loading aids 2 and are picked according to an order into one of four order loading aids 4 at a picking station 3 that is operated unmanned. The storage and order-picking system 1 comprises an article store 5 in which articles are stored in the storage loading aids 2 on several levels. A control device 6 manages the storage places in the article store 5 and actuates all the devices described below for conveying and picking the articles.

Level-operating devices moving between the racks 7 of the article store 5 fetch the storage loading aids 2 of articles to be removed from storage and transfer them to lifts in the article store 5. From those lifts, the storage loading aids 2 are transferred to a first conveyor system 8 which conveys said storage loading aids 2 removed from the article store 5 to the picking station 3 that is operated unmanned. At the picking station 3, one or several articles is/are removed by a fully-automated robotic gripping unit 9 from the storage loading aid 2 and is/are deposited according to the order in the order loading aid 4 intended therefor, which will be addressed in detail on the basis of the further figures.

After the order picking, the storage loading aid 2 is again stored in the article store 5 via the first conveyor system 8, if articles remain in the storage aid 2. Upon completion of the picking of an order into an order loading aid 4, said order loading aid 4 is conveyed away via a second conveyor system 10. The storage and order-picking system 1, only a detail of whose layout is illustrated in FIG. 1, comprises a plurality of racks 7 and several picking stations 3 that are operated unmanned and are arranged in parallel. Depending on the design of the picking station 3, it is also possible for the robotic gripping unit 9 to pick in parallel into more than four order loading aids 4. Depending on the implementation of the robotic gripping unit and the second conveyor system 10, it is easily feasible to fill ten or twenty order loading aids 4 in parallel.

Figure 2:
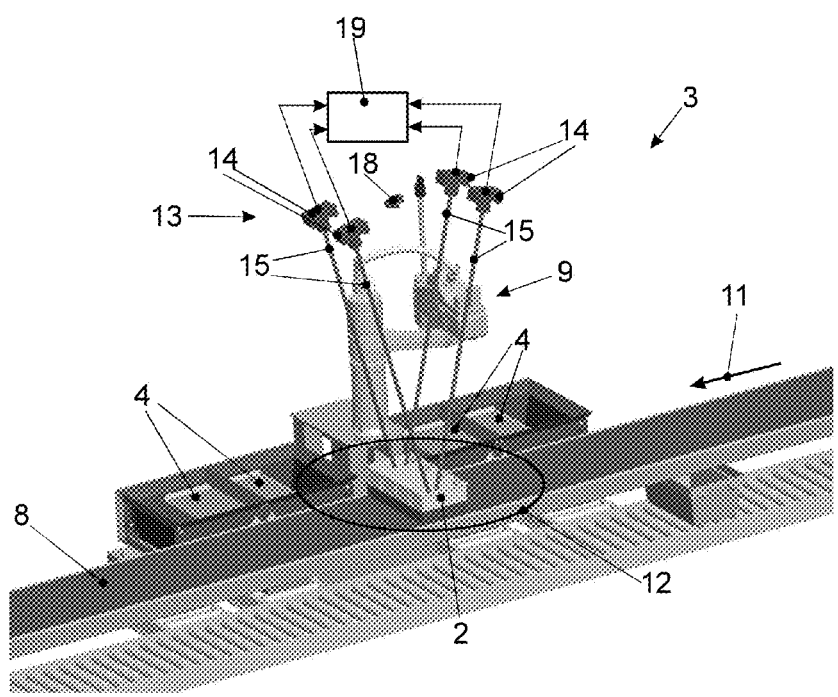
FIG. 2 shows the picking station operated unmanned according to FIG. 1 in an oblique view.

FIG. 2 shows the picking station 3 operated unmanned in an oblique view. The storage loading aids 2 are conveyed by the first conveyor system 8 through a gripping region 12 of the gripping unit 9 in a direction 11. The gripping unit 9 is formed by a commercially available articulated gripper, as described, for example, in WO 2012/163666A1. Preferably, a so-called SCARA robot as known to a person skilled in the art is used as a robot. However, the gripping unit 9 could also be attached to a delta robot as described in the previously mentioned EP 2 315 714 B1. For actuating such gripping units 9 in order to grip and lift up an object or, more specifically, an article, information regarding the gripping points must be transmitted to the robot control. Depending on the position and location of the article and depending on the outward shape and the stability, a gripping point is determined.

The picking station 3 now has an image identification device 13 for determining possible gripping points for the gripping unit 9 in order to grip articles from the storage loading aids 2. The image identification device 13 according to FIG. 2 comprises four cameras 14 in the area of the robotic gripping unit 9, which are arranged in a rectangle above the gripping region 12. The capturing directions 15 of the four cameras 14 are inclined toward each other and aligned such that the cameras 14 will project into the storage loading aid 2 located in the gripping region 12 of the gripping unit 9.

Figure 3:
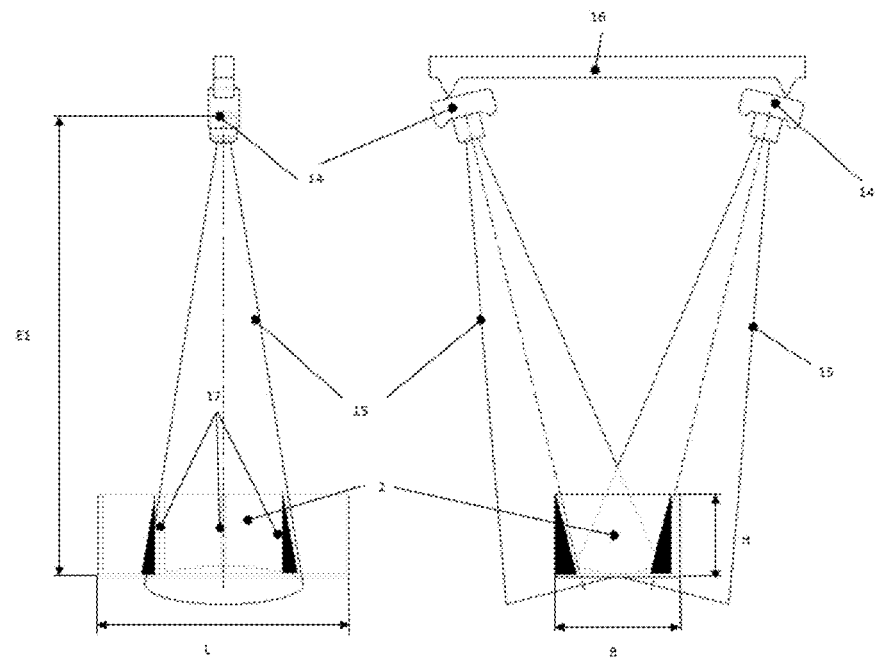
FIG. 3 shows an image identification device with two cameras.

FIG. 3 shows an image identification device comprising two cameras 14 with a storage loading aid 2 in a schematic illustration from two sides. The two cameras 14 are arranged on a camera arm 16 which determines the space between the cameras 14 and is fixed at a distance E1 from the storage loading aid 2 conveyed with the first conveyor system 8. The storage loading aid 2 has a height H, a width B and a length L, while being divided by compartment partitions 17 for storing different types of articles. As a result of the inclination of the capturing directions 15 of the cameras 14 toward each other and via the walls and the compartment partitions 17 of the storage loading aids 2, areas in the storage loading aid 2 depicted in grey in FIG. 3 will emerge, in which the image identification device is able to establish no or only insufficient information about the location and position of the articles located in the storage loading aid 2. It is thus advantageous to determine the position of the cameras 14 and their number depending on the storage loading aids 2 and the geometric dimensions thereof.

Figure 4:
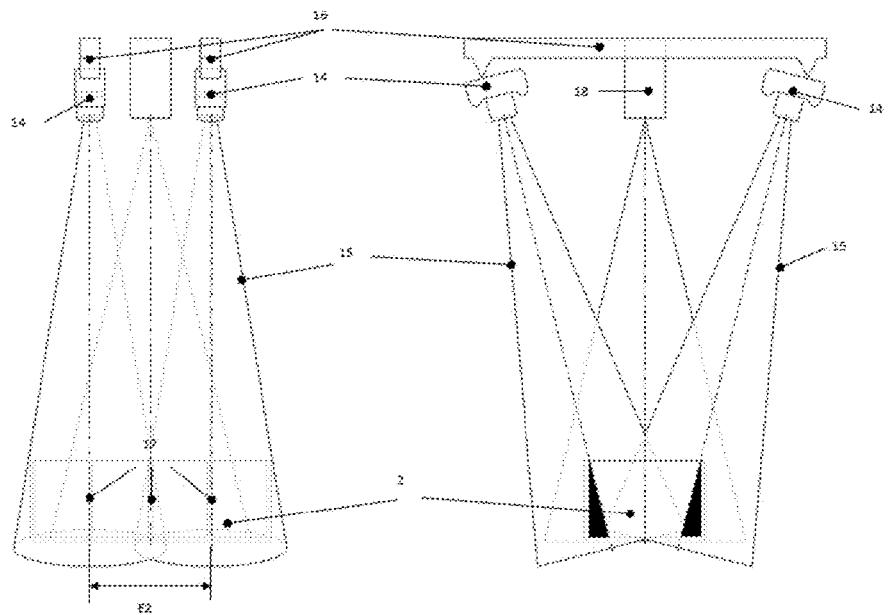
FIG. 4 shows an image identification device with four cameras.

FIG. 4 shows an image identification device comprising four cameras 14 with a storage loading aid 2 in a schematic illustration from two sides. It is clearly visible that the determination of the space between the cameras 14 at a distance E2 which corresponds to the space between the compartment partitions 17 allows all areas in the storage loading aid 2 to be identified properly by the image identification device in order to determine the location and position of the articles in the storage loading aid 2.

Furthermore, the image identification device according to FIG. 4 now comprises illuminants 18 which illuminate the storage loading aid 2 located in the gripping region 12 with the pattern of a grid. A person skilled in the art is per se familiar with illuminants for illuminating an object with a pattern or grid, for which reason they will not be described herein in further detail.

Figure 5:
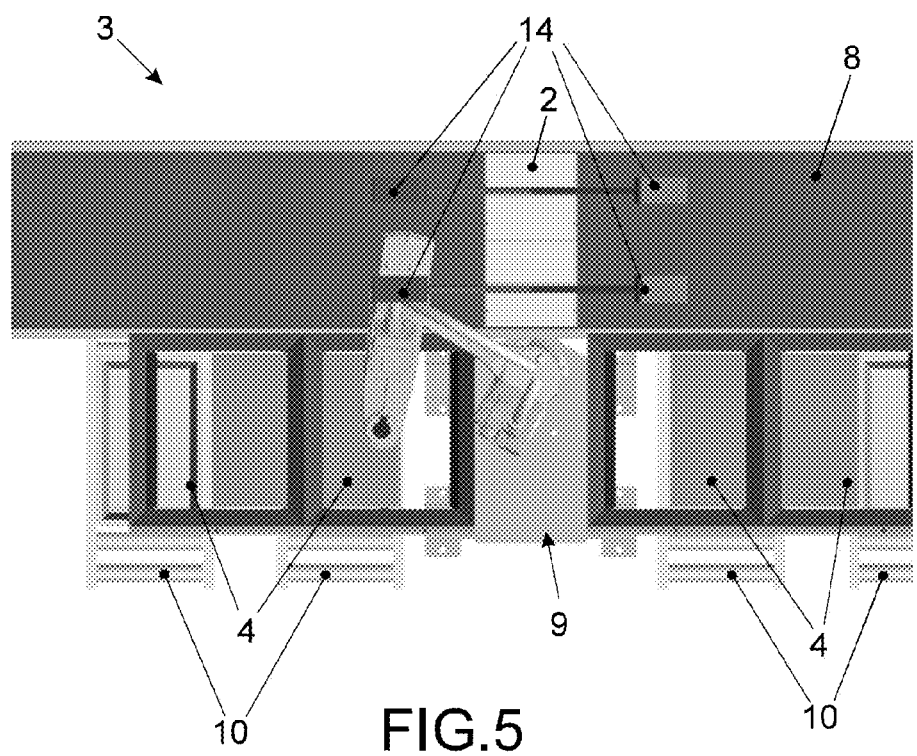
FIG. 5 shows the picking station according to FIG. 2 in a top view.
Figure 6:
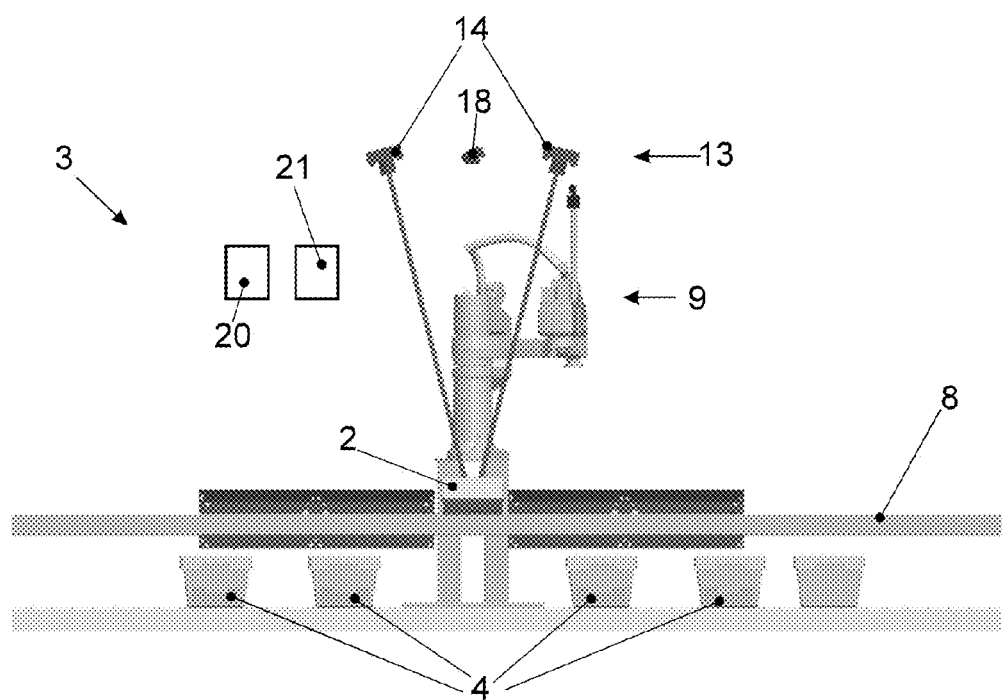
FIG. 6 shows the picking station according to FIG. 2 in a side view.

FIG. 5 shows the picking station 3 according to FIG. 2 in a top view, and FIG. 6 shows it in a side view. The image information established by the four cameras 14 is evaluated by an evaluation device 19 of the image identification device 13, and possible gripping points are continuously transmitted to the gripping unit 9. For this purpose, the evaluating device 19 receives information from the control device 6 about the type of article in the storage loading aid 2 and as to which quantity of said article is to be removed from the storage loading aid 2. On the basis of the image information from the four cameras 14, the evaluating device 19 determines the location and position of the desired articles and defines the article or the articles and their gripping points for the robot control.

By providing the image identification device 13 with the four cameras 14 in the area of the gripping unit 9 in order to continuously determine possible gripping points of the articles to be picked, the advantage is obtained that a transport of the storage loading aid 2 from the image identification device 13 to the robotic gripping unit 9, during which the article(s) to be gripped might change their position or location, is not necessary. By arranging the cameras 14 of the image identification device 13 and by transferring the gripping points determined by the image identification device 13 directly to the gripping unit 9, the robotic gripping unit 9 can also be readjusted still during the gripping operation and the article intended for picking can be gripped reliably, if said article changes its location or position immediately before gripping, which is usually required in case of several gripping operations from one storage loading aid 2.

In this regard, it is particularly advantageous that the image identification device 13 and the robotic gripping unit 9 co-operate so closely that articles can be removed and picked not only with the first conveyor system 8 being stationary, but also at the normal transport speed of the storage loading aids 2. During the order picking, the transport speed of the first conveyor system 8 may range, for example, from 0.1 to 1.2 m/s. As a result, order picking performances are possible which are substantially higher in comparison to known picking stations according to the prior art which are operated unmanned.

According to an exemplary embodiment of the invention, folding trays would be provided above the order loading aids, onto which the robotic gripping unit would place the articles removed from the storage loading aids. After one or several articles intended for the order loading aid has/have been placed on the folding tray by the robotic gripping unit, the control device would tip the articles located on the folding tray into the order loading aid. In this way, the picking can be accelerated further, since the robotic gripping unit does not have to reach into each order loading aid for each article and the time for the exchange of two order loading aids on the conveyor system can be bridged by the deposition on the tray.

The image identification device 13 now has a further camera 20 for discerning an identification of the article gripped with the gripping unit 9. For discerning the identification, the robotic gripping unit 9 holds the gripped article, after it has been taken from the storage loading aid 2, into the captured area of the additional camera 20. In doing so, for example, a barcode or a QR code located on the article's package can be identified by the evaluating device 19 in order to ensure that the collected article is really the article to be picked. In case several types of articles in a storage loading aid 2 are located jointly in an area of the storage loading aid 2, the robotic gripping unit 9 could randomly grip one of those articles, holding it toward the camera 20. By means of the identification, the evaluating device 19 would then discern as to whether said article should actually be picked and, based on said identification, would also determine in which ones of the order loading aids 4 the collected article should be deposited.

Furthermore, the picking station 3 of the storage and order-picking system 1 now has a label applicator 21 which is designed for applying a label or, respectively, a sticker to the article gripped by the gripping unit 9. For applying the label to the gripped article, the robotic gripping unit 9 is designed for conveying the article to the label applicator 21. For the identification of the article, the label may, in turn, exhibit a barcode, a QR code or an RFID tag. As a result, the advantage is obtained that articles gripped by the gripping unit 9 can be identified reliably and, optionally, marked in addition. For example, a tag could be stuck to the package of an article indicating that the package is damaged, if this has been detected by the image identification device 13 during the order picking.

Furthermore, the picking station 3 is now configured for having the robotic gripping unit 9 deposit the picked articles in the order loading aid 4 in a stacked or ordered manner. As a result, the picked articles are positioned in a particularly space-saving manner. Similarly, however, lighter articles could also be placed on heavier articles in the order loading aid 4 by the robotic gripping unit 9.

Furthermore, the picking station 3 is now configured such that the robotic gripping unit 9 will pick storage loading aids 2 instead of articles. As a result, empty storage loading aids 2 from the first conveyor system 8 can be collected on the second conveyor system 10.

It may be mentioned that the cameras 14 could also be arranged in a circle or an ellipse around the robotic gripping unit 9. The arrangement of the cameras 14 in the area of the robotic gripping unit which is convenient for the respective implementation is determined such that as many of the cameras 14 as possible have a clear view of the storage loading aid 2 for the entire time if possible. However, by providing several cameras, it is achieved that, even if just one or two cameras has/have no clear view of the storage loading aid 2, the other cameras will still provide image information for the image identification device. In an exceptional case, the gripper of the gripping unit can be moved sideways by the robot also at short notice in order to allow all cameras to have a clear view of the articles in the storage loading aid.

It may be mentioned that also patterns different from grids, i.e., for example, rhombic or circular line structures, may be illuminated on the storage loading aid by the illuminants for a better identification of the position and location of the articles.

It may be mentioned that five or, for example, ten cameras 14 might also be provided for the image identification device.

It may be mentioned that the capturing directions 15 of the two or more cameras of the image identification device 13 may be aligned parallel to each other or at a certain angle. It has proved to be particularly advantageous to align the capturing devices 15 into the storage loading aid 2 located in the gripping region 12 of the gripping unit 9 in a manner of being inclined toward each other. In this way, the entire area in the storage loading aid 2 can be viewed particularly well.

The invention claimed is:

1. A storage and order-picking system for the fully-automated picking of articles that are stored in storage loading aids and are picked according to an order, comprising:
    an article store;
    a first conveyor system that conveys storage loading aids leaving the article store to a picking station that is operated unmanned;

a fully-automated gripping unit on said picking station, which removes articles to be picked from said storage loading aids and deposits the articles, in accordance with the order, in an order loading aid which is subsequently conveyed away by a second conveyor system; and an image identification device for determining possible gripping points for the gripping unit in order to grip articles from the storage loading aids, wherein the image identification device includes at least two cameras in the region of the gripping unit, the capturing directions of which are aligned into the storage loading aid located in the gripping region of the gripping unit, while being coordinated and inclined toward each other, and wherein the gripping unit is movable sideways on short notice for determining possible gripping points, in order to allow at least two cameras of the image identification device to have a clear view of the articles in the storage loading aid.

2. A storage and order-picking system according to claim 1, wherein the image identification device is configured for determining the possible gripping points and the gripping unit is configured for gripping the articles from the storage loading aid, and wherein the storage loading aid is stationary or is transported at a reduced speed or at the normal transport speed of the first conveyor system.

3. A storage and order-picking system according to claim 1, wherein the gripping unit is configured for adjusting the gripping points for picking up the article also during the approach of the gripper toward the article to be gripped, if the possible gripping points continuously determined by the image identification device have changed.

4. A storage and order-picking system according to claim 1, wherein at least one of the storage loading aids exhibiting a length, a width and a height is part of the storage and order-picking system and the space between the at least two cameras and the distance of the cameras from the storage loading aid are determined depending on the height or the width of the storage loading aid or, respectively, the compartment partition of the storage loading aid, which is transported by the first conveyor system.

5. A storage and order-picking system according to claim 1, wherein illuminants are provided which illuminate the storage loading aid located in the gripping region and illuminate the gripping region with a pattern or a grid.

6. A storage and order-picking system according to claim 5, wherein the illuminants illuminate in the frequency range not visible to humans and the cameras are configured so as to be sensitive in the frequency range.

7. A storage and order-picking system according to claim 1, wherein at least four cameras are arranged around the gripping unit.

8. A storage and order-picking system according to claim 1, wherein a folding tray is provided above at least one order loading aid and the gripping unit is configured for depositing the articles collected from the storage loading aids on the folding tray, before the articles are tipped from the folding tray into the order loading aid.

9. A storage and order-picking system according to claim 1, wherein, with the image identification device, an identification contained on the article picked up by the gripping unit and which marks said article is discerned and, depending on the identification, the gripping unit is configured for depositing the article in the order loading aid or another loading aid.

10. A storage and order-picking system according to claim 9, wherein the image identification device comprises an additional camera for discerning the identification of the article and that the gripping unit holds the gripped article into the captured area of the additional camera for discerning the identification.

11. A storage and order-picking system according to claim 1, wherein the picked articles are stacked or arranged in order in an order loading aid by the gripping unit and that, for applying a label, the robotic gripping unit conveys the gripped article to a label applicator.

12. A storage and order-picking system according to claim 1, wherein the gripping unit is configured for collecting empty storage loading aids from the first conveyor system onto the second conveyor system.

13. A picking station that is operated unmanned for a storage and order-picking system for the fully-automated picking of articles that are stored in storage loading aids and are picked according to an order, comprising:

a fully-automated gripping unit on said picking station, which removes articles to be picked from said storage loading aids and deposits the articles, in accordance with the order, in an order loading aid which is subsequently conveyed away by a second conveyor system; and an image identification device for determining possible gripping points for the gripping unit in order to grip articles from the storage loading aids, wherein the image identification device includes at least two cameras in the region of the gripping unit, the capturing directions of which are aligned into the storage loading aid located in the gripping region of the gripping unit, while being coordinated and inclined toward each other, and wherein the gripping unit is movable sideways on short notice for determining possible gripping points in order to allow at least two cameras of the image identification device to have a clear view of the articles in the storage loading aid.

* * * * *